United States Patent [19]

Herd et al.

[11] 4,451,047
[45] May 29, 1984

[54] SEAL

[75] Inventors: David P. Herd; Duane E. Gibson, both of Houston, Tex.

[73] Assignee: Smith International, Inc., Newport Beach, Calif.

[21] Appl. No.: 429,533

[22] Filed: Sep. 30, 1982

Related U.S. Application Data

[63] Continuation of Ser. No. 288,742, Jul. 31, 1981, abandoned.

[51] Int. Cl.³ .................................................. F16J 15/18
[52] U.S. Cl. ................................ 277/26; 251/214; 277/102; 277/123; 277/229; 277/DIG. 6; 285/140
[58] Field of Search ............... 277/DIG. 6, 26, 102, 277/123, 125, 229, 116.2; 285/140, 340, 348; 251/214

[56] References Cited

U.S. PATENT DOCUMENTS

| 816,190 | 3/1906 | Sieger . | |
|---|---|---|---|
| 1,323,660 | 12/1919 | Thrift . | |
| 1,440,207 | 12/1922 | Burns . | |
| 1,584,394 | 5/1926 | Munley . | |
| 1,654,463 | 12/1927 | Jacques . | |
| 1,971,169 | 8/1934 | Wheeler | 308/134 |
| 2,090,956 | 8/1937 | Wheeler | 286/31 |
| 2,120,982 | 6/1938 | Layne | 166/10 |
| 2,135,583 | 11/1938 | Layne | 166/10 |
| 2,341,164 | 2/1944 | Shimek | 285/194 |
| 2,391,900 | 1/1946 | Hobbs | 285/167 |
| 2,511,109 | 6/1950 | Haskell | 286/27 |
| 2,571,560 | 10/1951 | Gall | 288/2 |
| 2,691,814 | 10/1954 | Tait | 29/182.5 |
| 2,995,388 | 8/1961 | Morello, Jr. et al. | 285/340 |
| 3,179,426 | 4/1965 | Duer | 277/112 |
| 3,312,150 | 4/1967 | Strader | 92/252 |
| 3,365,219 | 1/1968 | Nicolaus | 285/340 |
| 3,436,084 | 4/1969 | Courter | 277/116.2 |
| 3,443,816 | 5/1969 | Saleri et al. | 277/112 |
| 3,464,709 | 9/1969 | Furgason et al. | 277/213 |
| 3,467,394 | 9/1969 | Bryant | 277/1 |
| 3,469,853 | 9/1969 | Gullick | 277/112 |
| 3,608,912 | 9/1971 | Templin et al. | 277/123 |
| 3,612,538 | 10/1971 | Sievenpiper | 277/165 |
| 3,679,241 | 7/1972 | Hoffman | 285/340 |
| 3,840,257 | 10/1974 | Moore | 285/334.3 |
| 3,870,589 | 3/1975 | Shobert | 277/DIG. 6 |
| 3,929,358 | 12/1975 | Eckhardt | 285/353 |
| 4,050,701 | 9/1977 | Webb | 277/125 |
| 4,056,272 | 11/1977 | Morrill | 285/140 |
| 4,068,853 | 1/1978 | Schnitzler | 277/102 |
| 4,082,105 | 4/1978 | Allen | 137/72 |
| 4,090,719 | 5/1978 | Simanskis et al. | 277/125 |
| 4,109,942 | 8/1978 | Morrill | 285/140 |
| 4,116,451 | 9/1978 | Nixon et al. | 277/DIG. 6 |
| 4,157,835 | 6/1979 | Kahle et al. | 277/102 |
| 4,190,257 | 2/1980 | Schnitzler | 277/102 |
| 4,214,600 | 7/1980 | Williams, Jr. et al. | 137/72 |
| 4,230,299 | 10/1980 | Pierce, Jr. | 251/14 |
| 4,256,317 | 3/1981 | Havens | 277/DIG. 6 |
| 4,306,728 | 12/1981 | Huperz et al. | 277/125 |
| 4,328,974 | 5/1982 | White et al. | 277/122 |

Primary Examiner—Robert I. Smith
Attorney, Agent, or Firm—Ned L. Conley; David Alan Rose; William E. Shull

[57] ABSTRACT

Combined metal-to-metal/compliant material stem sealing means for high pressure, balanced, rising stem gate valve includes at least one seal set at each of the actuator and balance stems. Each seal set comprises a pair of frustoconical metal ring gaskets between which are disposed two make-up rings of compliant, tough material of high lubricity, e.g. tetrafluoroethylene polymer. One make-up ring is adjacent to one gasket, and the other make-up ring is adjacent to the other gasket. A core ring of material that expands substantially less volumetrically upon heating than the make-up rings, e.g. compacted graphite, is disposed between the make-up rings. Around the inner periphery of the core ring adjacent the respective actuator or balance stem is disposed a bearing ring of material like that used for the make-up rings, e.g. tetrafluoroethylene polymer. The seal set is compressed by a packing retainer such that the metal gaskets are coined into metal-to-metal sealing engagement with the stems and adjacent valve body parts. The sandwich stack, consisting of the core ring and bearing ring disposed between the make-up rings, is deformed to conform to the shape of, and fills substantially all of the space between, the compressed metal ring gaskets. The volume of the core ring is approximately one-third of the total volume of the sandwich stack.

20 Claims, 3 Drawing Figures

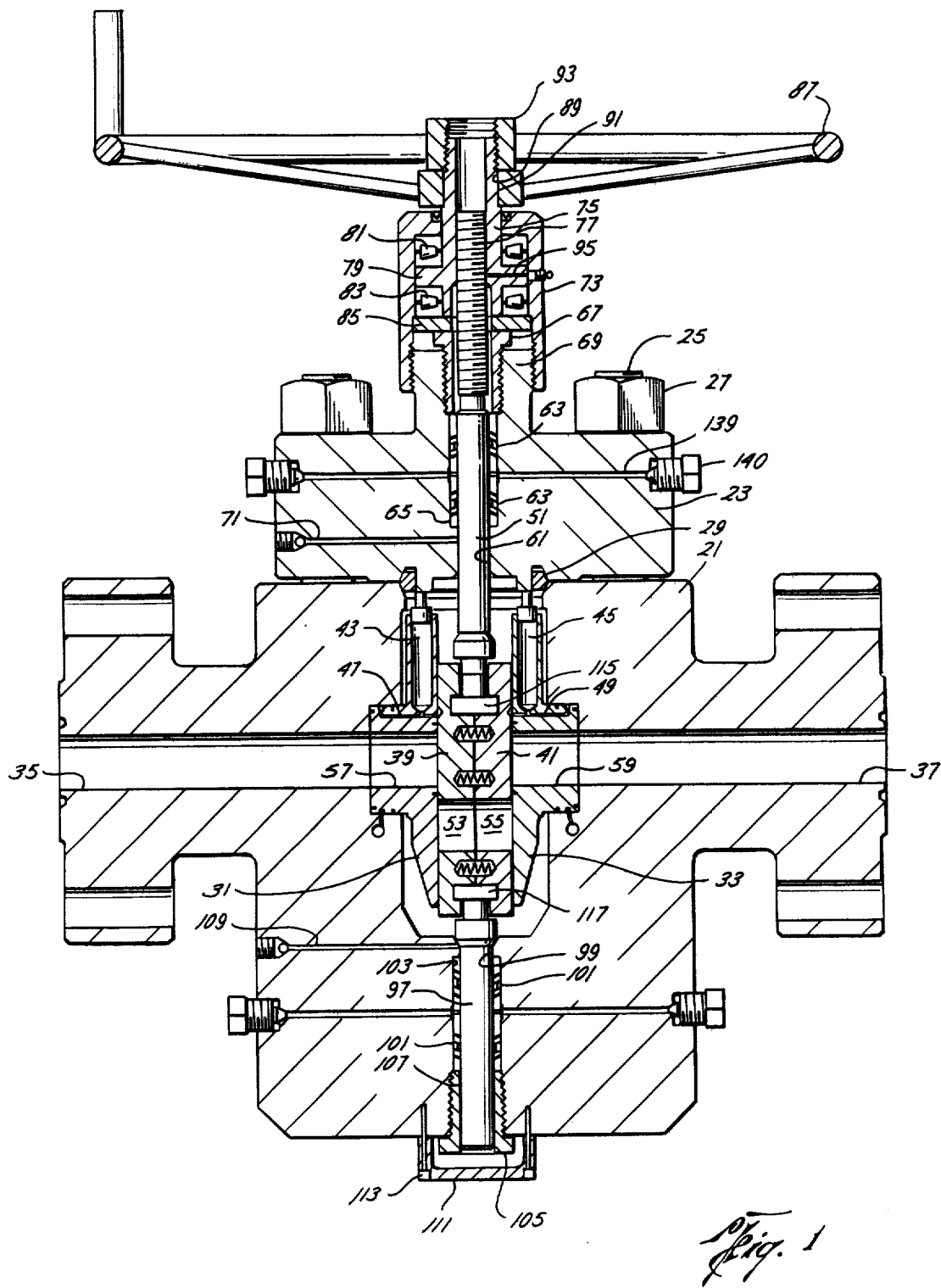

AS ENERGIZED

AS INSTALLED

SEAL

This is a continuation of application Ser. No. 288,742 filed July 31, 1981 and now abandoned.

CROSS-REFERENCES TO RELATED APPLICATIONS

The valve in which the stem sealing means of the present invention is used is of the high pressure, high temperature, balanced rising stem gate valve type similar to those disclosed in pending U.S. patent applications Ser. No. 833,684, filed Sept. 15, 1977 by David P. Herd and entitled "A Temperature Resistant, Chemical Resistant, High Pressure Gate Valve with Preloaded, Stacked, Solid Lubricated Stem Seals;" and Ser. No. 697,084, filed June 16, 1976 by Charles D. Morrill and entitled "Extreme Temperature, High Pressure, Balanced Rising Stem Gate Valve with Super Preloaded, Stacked, Solid Lubricated, Metal-to-Metal Stem Seals."

The stem sealing means of the present invention is related to the stem sealing means disclosed in the above identified application Ser. No. 697,084.

The foregoing applications are assigned to the owner of the present application and their disclosures are incorporated herein by reference, including the references to the state of the art.

BACKGROUND OF THE INVENTION

In the oil and gas industry, wells are being drilled with increasingly higher downhole temperatures and pressures, sometimes in "sour" gas fields where the well fluids contain relatively high percentages of $H_2S$. Seals for oilfield valves and wellheads have been developed recently which are relatively resistant to deterioration from the combined effects of higher pressure and temperature, and from caustic well fluids such as $H_2S$.

In U.S. Pat. No. 4,056,272, issued Nov. 1, 1977 to Morrill, the same applicant as in application Ser. No. 697,084, and assigned to the owner of the present application, the disclosure of which is incorporated herein by reference, there is disclosed a static seal between a wellhead and a pipe hanger supported therein, the seal comprising a pair of frustoconical elastic metal ring gaskets of substantially rectangular cross section, which are flattened by a lockscrew and compression ring and stressed until the edges of the metal ring gaskets flow plastically or "coin" into metal-to-metal sealing engagement with the parallel cylindrical walls of the wellhead and pipe hanger. In this static seal, a deformable ring having an initial generally trapezoidal cross section and made of, for example, Teflon, polyurethane or rubber, is disposed between the metal ring gaskets and compressed upon flattening of the metal ring gaskets into a rectangular cross section configuration and into engagement with the walls of the wellhead and pipe hanger. The deformable ring in this static seal acts as a backup seal for the metal ring gaskets in case of less than perfect sealing by the metal ring gaskets, for example, due to scratches or machine marks in the wellhead or on the pipe hanger. The deformable ring will flow into and seal any of such scratches or machine marks.

One seal used for dynamic as well as static sealing between the stem of a valve and the valve body or bonnet employs frustoconical elastic metal ring gaskets of rectangular cross section disposed in a stuffing box around the stem, with sandwich rings of a more compliant material disposed between the elastic metal ring gaskets. The reasons for the metal ring gaskets being elastic, similar to Belleville springs although not made of spring steel but a softer material, include (1) the gaskets have a larger inner diameter and a smaller outer diameter when unstressed, so that the seal unit can be easily inserted and withdrawn from the stuffing box without undue frictional engagement with the valve stem or stuffing box; (2) the gaskets will maintain their stressed engagement with the stem and stuffing box during use of the valve despite slight changes in the valve dimensions due to, for example, temperature and pressure variations, which would change slightly the deformation or strain on the gaskets created initially by tightening of the packing retainer. In other words, the gaskets must be elastic in order to maintain their preload.

The above referred to valve stem seal is disclosed in the aforementioned application Ser. No. 697,084, and in an ASME paper entitled "Seals for Valve Stems and Wellheads in High Pressure-High Temperature Service," by C. D. Morrill and C. W. Meyer, prepared for presentation at a conference in Mexico City, Mexico, on Sept. 19–24, 1976, the disclosure of which is incorporated herein by reference. The seal as disclosed therein is compressed by a threaded packing retainer such that the metal ring gaskets are flattened, and their inner and outer peripheral edges are deformed or "coined" into metal-to-metal sealing engagement with both the outer surface of the valve stem and the walls of the stuffing box. The sandwich rings between the metal ring gaskets are also deformed upon compression of the seal to conform to the shapes of the metal ring gaskets and to engage the stem and stuffing box. The sandwich rings should therefore be elastic to some degree. The initial deformation will usually cause the sandwich rings to take on an initial permanent set, but they will remain elastic to some degree. Materials used for the sandwich rings in such seals have included fluoroplastics, e.g. tetrafluoroethylene polymer, and graphite materials. Such materials have also included tetrafluoroethylene polymer filled with up to about 15% molybdenum disulfide.

The sandwich rings of the valve stem seal just described are dynamic seals, acting primarily during stem motion to seal between the metal ring gaskets and the stem when the metal ring gaskets are disturbed by stem drag while the stem is in motion. Such sandwich rings also tend to lubricate the areas of contact between the stem and metal ring gaskets by rubbing off onto the stem to some degree to reduce friction between the stem and the metal ring gaskets. The sandwich rings are also lubricious so as to reduce friction between the stem and the sandwich rings, and between the sandwich rings and the metal ring gaskets. The sandwich rings further act as backup seals for the metal ring gaskets, like the deformable ring backup seals as described above for the wellhead-pipe hanger seal of U.S. Pat. No. 4,056,272, to flow into and seal any scratches or machine marks on the stem.

The invention herein disclosed is an improvement over the valve stem seal described above.

One embodiment of the stem seal described above includes three metal ring gaskets and two sandwich rings disposed therebetween, and is known as an "SMT" type seal. The SMT type seal has been found to provide satisfactory stem sealing for valves having working pressures up to about 25,000 p.s.i., at temperatures from −20° F. to 300° F.

For valves having working pressures up to 30,000 p.s.i. or greater, however, the SMT type seal will not always provide a satisfactory seal for the valve stems under conditions expected to be encountered during service. Graphite materials alone, for example, are not desirable for SMT type stem seals for valves in the 30,000 p.s.i. class because such materials tend to extrude past the metal ring gaskets upon flattening the gaskets to energize the seal, since the graphite begins to extrude before the gaskets become flattened sufficiently to form a seal with the valve stem and stuffing box. Moreover, graphite materials tend to be worn or eroded away by movement of the valve stem as the graphite is deposited onto the stem and carried by the stem past the gaskets and out of the stuffing box. Such extrusion and wearing away of the graphite material under 30,000 p.s.i. service conditions may lead to leakage of well fluids past the seal and the need to replace the graphite ring.

Likewise, tetrafluoroethylene polymer ("TFE") materials alone, or such materials including $MoS_2$ as an additive, are not suitable for SMT type stem seals for valves in the 30,000 p.s.i. class because such materials are not capable of always maintaining a tight seal against such pressures after the valve is put through temperature cycling. A valve in oilfield service through which high pressure well fluids are flowing from deep wells may be heated by the well fluids to a temperature of about 300° F. When the well fluids stop flowing through the valve, for example if the well is shut in, the valve may cool down to ambient temperature, for example 70° F., and if the well is reopened and the well fluids begin flowing again, the valve will heat back up to 300° F. Thus, the valve's temperature is cycled between about 70° F. and about 300° F. A valve stem seal must be capable of remaining tight at all times, at all temperatures and through all temperature cycles to which the valve will be subjected in service. An SMT type seal using TFE rings, or $MoS_2$-filled TFE rings, will seal against well fluids at pressures of about 30,000 p.s.i. at ambient temperatures, e.g. 70° F., and again at elevated temperatures, e.g. 300° F., but when the valve is put through a thermal cycle from ambient temperature to 300° F. and back to ambient temperature, the SMT type seal will not always remain tight; sometimes the seal will exhibit minor leakage, either during valve stem movement or when the valve stem is stationary, or both. Although the leakage can be stopped by further tightening of the packing retainer, leakage will reoccur upon further temperature cycling.

It is an object of this invention to overcome the problems described above by providing a reliable valve stem seal suitable for valves having working pressures of the order of 30,000 p.s.i. or more and subject to temperature cycling, between temperatures in the range of −20° F. to 300° F. It is another object of this invention to provide such a seal that will remain tight and will not leak when subjected to well fluids having pressures of 30,000 p.s.i. or more and when the temperature of the valve is cycled from ambient temperature to about 300° F. and back to ambient temperature, without the need to re-tighten the packing retainer. It is also an object of this invention to provide such a seal that is simple, compact and economical, and easy to manufacture, install and service. It is also an object of this invention to provide such a seal that is low friction, durable and relatively resistant to deterioration due to fluctuations and extremes in temperature, high pressure and chemical activity of the well fluids sealed against.

SUMMARY OF THE INVENTION

According to the invention, a high pressure, balanced, rising stem gate valve has combined metal-to-metal/compliant material stem seal means between the bonnet part of the valve body and the valve actuating stem and between the chamber part of the valve body and the balance stem. Each seal means includes at least one seal set comprising a pair of frustoconical elastic metal ring gaskets between which are disposed two make-up rings of compliant, tough material of high lubricity, e.g. tetrafluoroethylene polymer, one make-up ring being adjacent to one of the metal ring gaskets and the other make-up ring being adjacent to the other of the metal ring gaskets. Between the make-up rings is disposed a core ring of material which expands substantially less volumetrically upon heating than the make-up rings, e.g. compacted graphite. The core ring has an inside diameter that is larger than the inside diameter of the make-up rings. Around the inner periphery of the core ring, between it and the valve actuating stem or the balance stem, is disposed a bearing ring, which may be of the same type of material used for the make-up rings, e.g tetrafluoroethylene polymer. Each seal set is disposed in an annular stuffing box in the adjacent part of the valve body extending around the stem. Each stuffing box is closed by an annular packing retainer screwed into the stuffing box far enough to flatten out the frustoconical metal ring gaskets such that the inner and outer periphery of each metal ring gasket engages the stem and stuffing box, respectively, with enough pressure to cause plastic deformation of its inner peripheral edge on its concave side and its outer peripheral edge on its convex side. The sandwich stack, consisting of the core ring and bearing ring disposed between the make-up rings, is deformed to conform to the shape of, and fills substantially all of the space between, the flattened metal ring gaskets. The volume of the core ring is approximately one-third of the total volume of the sandwich stack. When the valve is in service and subjected to thermal cycling, the seal will remain tight and retain its preload without the need for retightening the packing retainer. The valve stem seal set of this invention may also be used for packing off lock screws and in other situations wherein relatively movable parts subject to thermal cycling are to be sealed both during and after relative motion.

BRIEF DESCRIPTION OF THE DRAWINGS

For a detailed description of a preferred embodiment of the invention, reference will now be made to the accompanying drawings wherein:

FIG. 1 is a vertical section through a valve embodying the invention; and

FIG. 2B illustrates the stem sealing means of the present invention as installed in the valve but prior to its being energized by tightening the packing retainer. FIG. 2A illustrates the stem sealing means as energized.

DETAILED DESCRIPTION OF PREFERRED EMBODIMENT

Figures 2A, 2B:
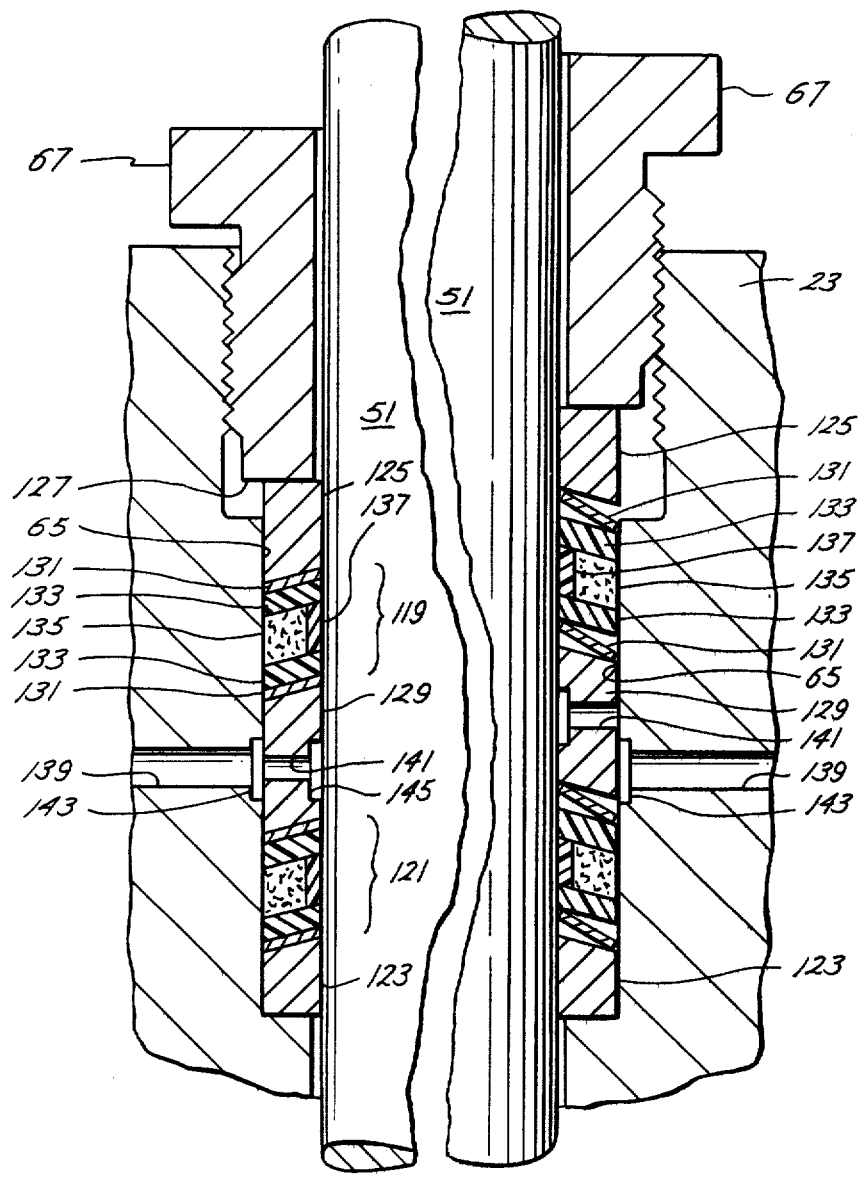
FIGS. 2A and 2B are fragmentary sectional views taken in the same plane as FIG. 1 but to a larger scale, and showing one embodiment of the actuator stem sealing means of the present invention in which the frustoconical metal ring gaskets point away from the pressure being sealed against inside the valve.

Referring to FIG. 1, there is shown a valve including a hollow body having a chamber part 21 and a bonnet part 23 secured thereto by studs 25 and nuts 27. The bonnet part 23 is sealed to the chamber part 21 by a suitable pressure energized gasket 29. Seats 31, 33 mounted at the inner ends of passages 35, 37 cooperate with a pair of ported gates 39, 41 which control flow of fluid, e.g. water, oil or gas, through the valve. Sealant material is stored in reservoirs 43, 45, and sealant is supplied automatically through the sealant distribution passages 47, 49 to the interfaces between the gates and seats and between the seat necks and valve body to effect sealing at such interfaces.

Gates 39, 41 are reciprocated by a generally cylindrical actuating stem 51 between a closed position, shown in FIG. 1, where flow of fluids through passages 35, 37 is prevented, and an open position permitting such flow in which gate ports 53, 55 are in register with ports 57, 59 in seats 31, 33. The upper end of actuating stem 51 extends out of valve chamber part 21 and through port 61 in bonnet 23. Seal means 63 according to the invention seals between stem 51 and a generally cylindrical stuffing box 65 in bonnet 23. Seal mean 63 is compressed in stuffing box 65 by a packing retainer 67 which is screwed into internally threaded neck 69 on the top of bonnet 23. A bleeder port 71 is used to check for leakage of fluids from between stem 51 and port 61 after backseating the stem.

The exterior of bonnet neck 69 is also threaded and receives a bearing cap 73 screwed thereon. An actuator nut 75 is screwed onto the threaded upper portion 77 of actuator stem 51 and has a flange 79 thereon disposed between upper and lower axial thrust bearings 81, 83. The lower thrust bearing 83 engages the top of a washer 85 disposed on top of packing retainer 67. The upper thrust bearing 81 engages the upper inside end of bearing cap 73. A hand wheel 87 includes a noncircular aperture 89 fitted over a correlatively shaped portion 91 of actuator nut 75. Hand wheel 87 is held in place by a retainer nut 93 screwed onto the upper end of actuator nut 75. A bleed port 95 allows fluid to escape from between threaded portion 77 of stem 51 and actuator nut 75.

A generally cylindrical balance stem 97 is connected to the lower ends of the gates and extends out of the valve chamber through port 99. Seal means 101 according to the invention seals between balance stem 97 and a generally cylindrical stuffing box 103 in the valve body. Seal means 101 is compressed in stuffing box 103 by lower packing retainer 105 which is screwed into a threaded socket 107 coaxial with port 99 and stuffing box 103. A bleeder port 109 is used to check for leakage of fluids from between balance stem 97 and port 99 when the enlarged portion on the upper end of the balance stem is fully seated in the annular seat in the valve body around port 99. A lower cap 111 is secured to the valve body over lower packing retainer 105 and the lower end of balance stem 97, by screws 113.

When hand wheel 87 is turned, actuator nut 75 turns and causes actuator stem 51 to raise or lower gates 39, 41 to which the stem is connected by hub 115. This in turn causes balance stem 97, connected to the gates by hub 117, to move up or down. Thus, there is relative axial motion between each of stems 51, 97 and the respective stem seal means 63, 101. Seal means 63, 101 must remain tight before, during and after such relative axial motion.

Seal means 63, 101 are alike, so only one need be described in further detail. Referring to FIGS. 2A and 2B, seal means 63 includes an upper seal set 119 and a lower seal set 121. A base adapter ring 123 is disposed in the bottom of annular stuffing box 65 below lower seal set 121. The bottom of base adapter ring 123 engages flush with and is correlative to the bottom of the stuffing box. A follower adapter ring 125 is disposed between the lower face 127 of packing retainer 67 and upper seal set 119. The upper end of follower adapter ring 125 engages flush with and is correlative to lower face 127 of packing retainer 67. An intermediate ring 129 is disposed between seal sets 119, 121. The upper face of base adapter ring 123, the lower face of follower adapter ring 125, and both upper and lower faces of intermediate adapter ring 129 are frustoconical in configuration, having the desired cone angles for the shapes of the seal sets 119, 121 in their final assembled positions. In this regard, it should be noted that FIG. 2B illustrates the seal means of the present invention as installed in the valve but prior to its being energized by tightening the packing retainer; FIG. 2A illustrates the seal means as energized, with the packing retainer screwed farther into its threaded receptacle and the seal sets and adapter rings in their final assembled positions. As is explained in more detail hereinafter, the metal ring gaskets of the seal sets are more sharply conical, that is, they have smaller cone angles, in their relaxed states shown in FIG. 2B than in their final energized states shown in FIG. 2A. If desired, either or both of adapter rings 123, 125 may be omitted, the bottom of the stuffing box and/or the lower end of retainer 67 being provided instead with a frustoconical surface of the desired cone angle and area. If used, adapter rings 123, 125, and adapter ring 129, should be made of fairly hard material such as, for example, 4140 steel. The valve body and bonnet need only be made of any steel conventionally used for high pressure valves.

Seal sets 119, 121 are alike, so only one need be described in further detail. Seal set 119 includes a pair of frustoconical metal ring gaskets 131 between which are disposed two identical make-up rings 133. Make-up rings 133 are made of tough, compliant, solid lubricious material having a lower elastic modulus than metal ring gaskets 131. One make-up ring is disposed adjacent to one of the metal ring gaskets, and the other make-up ring is disposed adjacent to the other of the metal ring gaskets.

A core ring 135 is disposed between make-up rings 133. Core ring 135 has a lower coefficient of volumetric thermal expansion than make-up rings 133. The inside diameter of core ring 135 is greater than the inside diameter of make-up rings 133. Around the inner periphery of core ring 135, between it and valve actuating stem 51, is disposed a bearing ring 137 of tough, compliant, solid lubricious material which may be of the same type used for make-up rings 133. Bearing ring 137 makes a sliding fit within the aperture in core ring 135.

The metal ring gaskets 131 in their relaxed state have a generally rectangular cross-section which lies at about a 30° angle to the horizontal. Thus, the cone angle for the gaskets 131 in relaxed condition is about 120°. Gaskets 131 in such relaxed condition have a radial clearance with both stem 51 and stuffing box 65 so that neither the stem nor the stuffing box will be damaged upon installing gaskets 131 in the valve. Gaskets 131 are just dropped into place. Upon energizing the seal means by tightening the packing retainer, the gaskets are flattened such that the inner diameter of each gasket is reduced and the outer diameter of each gasket is increased sufficiently that the inner peripheral edge on the concave side of each gasket and the outer peripheral edge on the convex side of each gasket are deformed or "coined," i.e. they flow plastically, into metal-to-metal sealing engagement with the stem and stuffing box, respectively. In order not to gall or mar the stems, the metal ring gaskets should be made of softer metal than the valve stems. The valve stems may be made of K Monel, for example, but a comparable steel would be suitable. It is preferred that the stem have a hard coating on it, such as a tungsten carbide coating of 3 to 5 mils thickness, to increase the hardness of and enhance the durability of the stem. Such a coating would raise the hardness of the stem from about 30 to about 60 Rockwell hardness. The metal ring gaskets should have sufficient plasticity to allow coining of the peripheral edges through high stress to effect the metal-to-metal seal, and should have sufficient strength to withstand the high preload and well fluid pressures found in service. They may be made, for example, of annealed (austenitic) stainless steel, such as No. 316 stainless steel, or of other metals such as carbon or alloy steel. To further reduce the possibility of galling or marring the stems, the inner peripheral edge on the concave side of each gasket is rounded, preferably with a radius equal to about one-half the gasket thickness, e.g. a radius of 0.02 inches for a gasket that is 0.04 inches thick. In flattened condition, the metal ring gaskets 131 make an angle of approximately 15° to the horizontal, corresponding to a cone angle of about 150°, conforming to the frustoconical faces of adapter rings 123, 125 and 129 which are also disposed at an angle of about 15° to the horizontal. It will be understood, of course, that while the metal ring gaskets are preferably frustoconical, shapes for the metal ring gaskets other than frustoconical may be employed.

The material used for make-up rings 133 and the bearing ring 137 should have a low coefficient of friction, that is, it should be a highly lubricious material. The material for make-up rings 133 and bearing ring 137 should also have sufficient strength and toughness to remain integral under high pressure, and should be resistant to chemical activity of the fluid being controlled by the valve, and should be able to withstand temperatures throughout the range expected to be encountered during service, e.g. 300° F. down to −20° F. Such material should also be sufficiently compliant or elastic to flow into any minute gaps which may be left between the metal ring gaskets and the stem and stuffing box due to scratches or machine marks on the stem or stuffing box, or between the metal ring gaskets and the newly adjacent stem surface during and after movement of the stem. Gaps of the latter type might occur, for example, because during and after movement of the stem, the inner peripheries of the metal ring gaskets will not instantaneously, and perhaps might not ever, flow further plastically to conform to the newly adjacent stem surface. The make-up and bearing ring materials will flow into and seal any of these minute gaps. Therefore the make-up and bearing rings may also be considered to be sealing rings. Materials suitable for the make-up rings 133 and bearing ring 137 include, for example, tetrafluoroethylene polymer, such as that sold under the trademark "Teflon," and "Moly-Teflon," which is like Teflon but includes up to about 15 percent molybdenum disulfide, $MoS_2$. A particular material found to be suitable is one having 5% by weight $MoS_2$ and 95% by weight TFE, and sold by Allied Chemical Company under the designation "No. 2021."

The material used for core ring 135 should, like the material used for rings 133, 137, have sufficient strength to withstand the high stress required for preloading the seal, and should also be resistant to chemical activity of the well fluids being sealed against and able to withstand temperatures throughout the range expected to be encountered during service, e.g. 300° F. down to as low as −75° F.

Further properties of the core ring 135 may be best appreciated from applicants' discovery of what they believe to be the cause of the leakage of the SMT type seal at high pressures upon extreme temperature cycling, although it is to be understood that the herein described seal solves the leakage problem regardless of the theory of its operation.

The leakage exhibited by the SMT type stem seal using TFE or $MoS_2$-filled TFE rings at pressures in the 30,000 p.s.i. range after temperature cycling apparently results from partial loss of the preload on the seal. Compare the loss of preload in pure elastomer packings disclosed in the ASME article referred to above. When the SMT type seal is first made up or energized, mechanical compression is placed upon the seal through tightening the packing retainer such that the seal is stressed to a greater degree than it would be stressed by the high pressure well fluids. When a valve including the SMT type stem seal heats up from ambient temperature to 300° F., the TFE rings try to expand, but cannot do so to any great extent, since they are substantially confined on all sides by metals which expand less rapidly than the TFE rings. This causes the preload stress on the seal to increase from which it was originally, that is, before heating. When the valve cools down to ambient temperature, the preload stress not only diminishes from its elevated level attained when the valve was heated, it becomes lower than it was originally. This is apparently due to one or the other, or perhaps both, of the following effects. When the valve is heated to about 300° F., the elevated stress, over and above the already high preload stress, on the seal and surrounding metal containment structure caused by thermal expansion of the TFE rings might cause slight permanent deformation or set, that is, yielding, of such surrounding metal containment structure so as to increase the volume occupied by the seal when the seal cools back down to ambient temperature, thereby reducing the stress on the seal below its preload. Alternatively, or perhaps cumulatively, when the TFE rings are stressed at the elevated level due to thermal expansion upon heating the valve to 300° F., the TFE rings could undergo a permanent deformation beyond that caused by the preload stress, that is, they might take on a further compressive set, which remains after the valve cools down to ambient temperature and results in a stress relief in the TFE rings which offsets somewhat the effect of the packing retainer's compressing of the seal. Thus, after temperature cycling, in order to regain the proper preload, the packing retainer would have to be retightened. Without such retightening, the valve would be unable to seal against pressures of the order of 30,000 p.s.i. without slight leakage.

According to the present invention, some of the preferred TFE or $MoS_2$-filled TFE material between the metal ring gaskets of the SMT type stem seal is replaced by a material which exhibits relatively little expansion when heated as compared to the TFE or MoS$_2$-filled TFE material. In the preferred embodiment of this invention, this low thermal expansion material is comprised in core ring 135, which is clad on its three sides adjacent the metal ring gaskets and stem by make-up rings 133 and bearing ring 137. Thus, core ring 135 must have a coefficient of volumetric thermal expansion that is lower than that for rings 133, 137. One such material suitable for core ring 135 is compacted graphite, such as is sold under the trademark "Grafoil." See U.S. Pat. No. 3,404,061. It is believed that the coefficient of volumetric thermal expansion for TFE, for example, is substantially greater than that for Grafoil, indeed several times greater, although precise values are not known to applicants. Published data indicate, however, that Grafoil, which is manufactured in such forms as thin flexible layered sheets or ribbon, has a coefficient of linear expansion of about $-0.02 \times 10^{-5}$ in/in°F. in directions parallel to the graphite layers, that is, along their length and width, over the range of 70° F. to 2,000° F., and of about $1.5 \times 10^{-5}$ in/in°F. in directions normal to the layers, that is, through their thickness, over the range of 70° F. to 4,000° F. TFE has a coefficient of linear expansion of about $7.0-10.0 \times 10^{-5}$ in/in°F. over the range of 78° F. to 500° F. For solids, the coefficient of volumetric thermal expansion is approximately three times the coefficient of linear thermal expansion. See *The Handbook of Chemistry and Physics*, 48th Edition, at page F-90 (Chemical Rubber Co. 1967). Assuming, then, that Grafoil were to expand volumetrically upon heating according to three times the larger of the values given above for linear expansion, this would still be less than one-fourth the volumetric expansion upon heating expected to be exhibited by TFE for heating of the valve from temperatures in the ranges of about 78° F. to about 300° F.

The stack of rings sandwiched between the metal ring gaskets, referred to hereinafter as the sandwich stack, consisting of the core ring 135 with bearing ring 137 disposed around its inner periphery and make-up rings 133 disposed adjacent the upper and lower faces of rings 135, 137, is deformed to conform to the shape of, and fills substantially all of the space between, the metal ring gaskets 131 as flattened in their energized condition. The rings of the sandwich stack typically are originally of rectangular cross-section, but may be deformed in a press prior to installation in the valve to assume the frustoconical shapes shown on the right hand side of FIG. 2, which are correlative to the frustoconical shaped surfaces of adapter rings 123, 125, 129 against which the metal ring gaskets are flattened. Alternatively, the rings of the sandwich stack may be installed in their original rectangular cross-section configuration, and deformed into frustoconical shape upon energizing the seal.

The material of which stress relief ring 135 is made may have the form of Grafoil ribbon wrapped tightly and compressed into a solid, endless ring. Such ribbon may be of the type sold by Union Carbide Corporation under the name Grafoil Ribbon-Pack and described in Union Carbide Corporation's Technical Information Bulletin No. 524-204. A ring of tightly wrapped Grafoil Ribbon-Pack material that has been compressed exhibits its highest thermal expansion in the radial direction when such a ring is installed in the stuffing box around the stem, that is, toward the stem and stuffing box.

Alternatively, ring 135 may be cut from a sheet of Grafoil, or sheets of Grafoil stacked together. The Grafoil available commercially may be only about 70 percent compressed or compacted, but can be fully, i.e. 100 percent, compressed or compacted either in a press prior to installation, as described above, or when in place in the valve upon energizing the seal.

Make-up rings 133 are thinner axially then ring 135 and ring 137, which have substantially the same axial thickness when ring 135 is fully compacted, but are wider radially than either of rings 135, 137. The combined radial widths of rings 135 and 137 is substantially the same as the radial width of rings 133. Rings 133 and 137 should make a close sliding fit with the stem upon installation of the sandwich stack in the valve. When the sandwich stack is compressed upon energizing the seal, the inner peripheries of rings 133, 137 are urged more tightly against stem 51, and the outer peripheries of rings 133 and 135 are urged into tight engagement with the walls of stuffing box 65.

Although two seal sets 119, 121 are shown in the drawings, applicants have found that one seal set alone is sufficient for providing a satisfactory seal. The second seal set, that is, the one farthest from the fluids being sealed against, is provided for emergency or back-up use, in case the first seal set fails. As another emergency or back-up sealing feature, a passage 139 is provided in bonnet 23, which passage is in register and fluid communication with a passage 141 through intermediate adapter ring 129 when the seal is energized. Passage 130 is also in fluid communication with an injection fitting 140 disposed in a threaded socket in the exterior of bonnet 23. An annular groove 143 in fluid communication with passage 139 is provided around the walls of stuffing box 65, and an annular groove 145 in fluid communication with passage 141 is provided around the inner periphery of intermediate adapter ring 129. If seal sets 119, 121 were to fail, then sealant material can be injected through injection fitting 140 and passages 139, 141 to grooves 143, 145 to provide an emergency or back-up seal around the stuffing box and stem, respectively.

The seal means of the present invention is preloaded by tightening the packing retainer to a stress substantially higher than the stress expected to be caused by fluid pressure when the valve is in service. Typical preload stress for the stem seals for a valve such as depicted in FIG. 1, which has a rated working pressure of 30,000 p.s.i., is 37,500 p.s.i.

When a valve incorporating the stem sealing means of the present invention is heated from ambient temperature, e.g. 70° F., to about 300° F., for example by the fluids flowing through the valve, and is then cooled back down to ambient temperature, no further tightening of the packing retainer is necessary. Thus, the original preload on the valve is maintained upon temperature cycling. This is due apparently to the fact that the stress over and above the original preload stress caused by attempted thermal expansion of the material between the metal ring gaskets 131 is not great enough to cause the permanent deformation or set of the metal containment structure of the valve parts adjacent to the seal due to the lower thermal expansion of the core ring 135 as compared to the make-up rings 133 and the bearing ring 137. For the same reason, the additional stress due to heating is apparently low enough to avoid the rings' 133, 137 taking on of a further permanent deformation or compressive set, which in turn avoids loss of preload stress when rings 133, 137 relax upon cooling.

Applicants have found that the stem sealing means of the present invention works well in sealing 30,000 p.s.i. fluids over temperature cycles from −20° F. to 300° F. without additional tightening of the packing retainer, when make-up rings 133 and bearing ring 137 are made of 5% MoS$_2$-filled TFE, core ring 135 is made of Grafoil, and when the volume of the stress relief ring 135 is approximately one-third the total volume of the sandwich stack. That is, in the preferred embodiment, the combined volume of make-up rings 133 and bearing ring 137 is approximately twice the volume of core ring 135. The material used for the make-up rings 133 will not extrude past the metal ring gaskets 131 upon energizing the seal, and will confine the Grafoil core ring 135 between them during energizing the seal to prevent its extruding past the gaskets 131 before the gaskets form the metal-to-metal seals with the stem and stuffing box. Also, the 5% MoS$_2$-filled TFE bearing ring 137 around the inner periphery of the Grafoil core ring 135 reduces the friction between the stem and the stem seal means and prevents undue wear on the core ring. Thus, a Grafoil core ring with its low thermal expansion, clad on its three sides adjacent the stem and metal gaskets by 5% MoS$_2$-filled TFE rings and wherein the Grafoil ring has about one-half the combined volume of the 5% MoS$_2$-filled TFE rings, is preferred for the sandwich stack of the present invention. Of course, other volume relationships for the rings of the sandwich stack may also work well, as may other materials for the rings comprising the sandwich stack.

Although FIGS. 1 and 2A and 2B show the cones of the metal ring gaskets and the rings of the sandwich stack pointing away from the pressure being sealed against, when sealing between parallel surfaces the inner and outer peripheries of the seal are similarly engaged and therefore the seal is reversible. Thus, the cones of the metal ring gaskets and the rings of the sandwich stack alternatively may be arranged to point toward the pressure being sealed against. Also, it will be understood that rings 133, 137 need not be separate rings. They may instead take the form of, for example, an integral cylindrical ring with a groove around the middle of its outer periphery, that is, a ring with a U-shaped cross-section. The Grafoil ring can then be snapped into place in the groove prior to installation in the valve.

While preferred embodiments of the invention have been shown and described, many modifications thereof can be made by one skilled in the art without departing from the spirit of the invention. Therefore, it should be understood that the details set forth herein are for illustration only, and are not intended to limit the scope of the invention as set forth in the following claims.

What is claimed as invention is:

1. Apparatus for sealing in high pressure, temperature cycled applications between the walls of an axially movable valve stem and a stuffing box around the valve stem, the stuffing box having a port in its bottom and the valve stem extending through the port and out of the stuffing box, such sealing apparatus being preloaded to a stress higher than the stress expected to be encountered in service, comprising:

first and second elastic metal ring gaskets disposed in such stuffing box around such valve stem, each gasket being compressed into metal-to-metal sealing engagement with both of such walls, and annular compliant seal means disposed in such stuffing box around such valve stem and sandwiched between said gaskets, said seal means including first and second annular portions of tough, compliant material adjacent said first and second gaskets, respectively, each annular portion being compressed into sealing engagement with both of such walls, and a core portion disposed between said first and second portions and composed of a material having a lower coefficient of thermal expansion than said material of said first and second annular portions, the relative volume of said core portion with respect to said first and second annular portions being such that upon such temperature cycling, the thermal expansion of said annular compliant seal means is less than that which would cause loss of such preload stress.

2. Apparatus of claim 1, wherein said material of said first and second annular portions has a low coefficient of friction.

3. Apparatus of claim 2, wherein said material of said first and second annular portions comprises tetrafluoroethylene polymer, and said material of said core portion comprises compacted graphite.

4. Apparatus of claim 3, wherein said material of said first and second annular portions further comprises up to about fifteen percent molybdenum disulfide.

5. Apparatus for sealing in high pressure, temperature cycled applications between the walls of an axially movable valve stem and a stuffing box around the valve stem, the stuffing box having a port in its bottom and the valve stem extending through the port and out of the stuffing box, comprising:

first and second elastic metal ring gaskets disposed in such stuffing box around such valve stem, and annular compliant seal means disposed in such stuffing box around such valve stem and sandwiched between said gaskets, said seal means including first and second annular portions of tough, compliant material having a low coefficient of friction comprising tetrafluoroethylene polymer with up to about fifteen percent molybdenum disulfide adjacent said first and second gaskets, respectively, and a core portion disposed between said first and second portions and composed of a material comprising compacted graphite having a lower coefficient of thermal expansion than said material of said first and second annular portions, said first and second annular portions comprising make-up rings in sealing engagement with such stem and such stuffing box and said core portion comprising a core ring having an inner diameter larger than the outer diameter of such stem, and further including a bearing ring of tough, compliant material disposed around the inner periphery of said core ring between said core ring and such stem.

6. Apparatus of claim 5, wherein said material of said bearing ring is the same as that of said make-up rings.

7. Apparatus of claim 6, wherein said core ring and said bearing ring together occupy substantially all of the space between said make-up rings, in the axial direction, and between such stem and such stuffing box, in the radial direction.

8. Apparatus of claim 7, wherein the volume of said core ring is about one-half the combined volumes of the make-up rings and bearing ring.

9. Apparatus of claim 1, wherein the coefficient of thermal expansion of said core portion material is less than one-fourth that of said material of said first and second annular portions.

10. Apparatus for sealing in high pressure, temperature cycled applications between the walls of an axially movable valve stem and a stuffing box around the valve stem, the stuffing box having a port in its bottom and the valve stem extending through the port and out of the stuffing box, comprising:
   first and second elastic metal ring gaskets disposed in such stuffing box around such valve stem,
   annular compliant seal means disposed in such stuffing box around such valve stem and sandwiched between said gaskets,
   said seal means including first and second annular portions of tough, compliant material adjacent said first and second gaskets, respectively, and a core portion disposed between said first and second portions and composed of a material having a lower coefficient of thermal expansion than said material of said first and second annular portions,
   and including means for compressing said first and second gaskets such that said gaskets are partially flattened and their inner and outer peripheral edges are coined into metal-to-metal sealing engagement with such stem and such stuffing box, and for urging said first and second annular portions of said seal means into sealing engagement with such stem and such stuffing box.

11. Apparatus for sealing in high pressure, temperature cycled applications between the walls of an axially movable valve stem and a stuffing box around the valve stem, the stuffing box having a port in its bottom and the valve stem extending through the port and out of the stuffing box, comprising:
   first and second elastic metal ring gaskets disposed in such stuffing box around such valve stem,
   annular compliant seal means disposed in such stuffing box around such valve stem and sandwiched between said gaskets,
   said seal means including first and second annular portions of tough, compliant material adjacent said first and second gaskets, respectively, and a core portion disposed between said first and second portions and composed of a material having a lower coefficient of thermal expansion than said material of said first and second annular portions, and
   means for compressing said first and second gaskets such that said gaskets are partially flattened and their inner and outer peripheral edges are coined into metal-to-metal sealing engagement with such stem and such stuffing box, and for urging said first and second annular portions of said seal means into sealing engagement with such stem and such stuffing box,
   said core portion being annular in configuration with its outer radial periphery adjacent such stuffing box and having an inner diameter greater than the outer diameter of such stem, said seal means including a third annular portion of tough, compliant material disposed between said core portion and such stem.

12. Apparatus of claim 11, said first, second and third annular portions being composed of tetrafluoroethylene polymer, and said core portion being composed of compacted graphite.

13. Apparatus of claim 11, said first, second and third annular portions being composed of a material consisting of ninety-five percent tetrafluoroethylene polymer and five percent molybdenum disulfide, said core portion being composed of compacted graphite, and wherein said first, second and third annular portions and said core portion occupy substantially all of the space between said metal ring gaskets, the stem and the stuffing box when said gaskets are compressed, said core portion having a volume equal to about one-third the total volume of said space.

14. Apparatus for sealing in extremely high pressure, temperature cycled applications between a fixed cylindrical wall and a cylindrical wall of a moving component for preventing fluid flow from the fluid side of the apparatus to the atmospheric side of the apparatus, such sealing apparatus being preloaded to a stress higher than the stress resulting from said extremely high pressure, comprising:
   first and second metal ring gaskets disposed between such fixed wall and such wall of such moving component, each gasket being compressed such that its peripheral edges are coined into metal-to-metal sealing engagement with both of such walls, and
   annular compliant seal means sandwiched between said gaskets,
   said seal means including first and second annular portions of compliant material adjacent said first and second gaskets, respectively, each annular portion being compressed into sealing engagement with both of such walls, and a core portion disposed between said first and second portions and composed of a material having a lower coefficient of thermal expansion than said material of said first and second annular portions, said core portion comprising means for limiting thermal expansion of said annular compliant seal means to an amount which maintains such preload on said sealing apparatus before, during, and after such temperature cycling.

15. Apparatus of claim 14, wherein said material of said first and second annular portions comprises tetrafluoroethylene polymer, and said material of said core portion comprises compacted graphite.

16. Apparatus for sealing in high pressure, temperature cycled applications between a fixed cylindrical wall and a cylindrical wall of a moving component for preventing fluid flow from the fluid side of the apparatus to the atmospheric side of the apparatus, comprising:
   first and second metal ring gaskets disposed between such fixed wall and such wall of such moving component, and
   annular compliant seal means sandwiched between said gaskets,
   said seal means including first and second portions of compliant material comprising tetrafluoroethylene polymer adjacent said first and second gaskets, respectively, and a core portion disposed between said first and second portions and composed of a material comprising compacted graphite having a lower coefficient of thermal expansion than said material of said first and second annular portions, said first and second annular portions comprising make-up rings in sealing engagement with such fixed wall and such wall of such moving component, said core portion being spaced from such wall of such moving component and there being included a bearing ring disposed in such space between said core portion and such wall of such moving component.

17. Apparatus of claim 16, wherein said bearing ring is composed of tetrafluoroethylene polymer.

18. Apparatus of claim 17, wherein said core portion and said bearing ring together occupy substantially all of the space between said make-up rings and between such fixed wall and such wall of such moving component.

19. Apparatus of claim 18, wherein the volume of said core portion is about one-half the combined volumes of the make-up rings and bearing ring.

20. Apparatus for sealing between a first cylindrical wall and a second cylindrical wall, the walls being substantially parallel to one another, in extremely high pressure, temperature cycled applications wherein such extremely high pressure is of the order of 30,000 psi or greater and the temperature to which such apparatus and walls are exposed is cycled from ambient temperature up to about 300° F. and back to ambient temperature, comprising:

first and second metal ring gaskets disposed between such first and second walls for providing primary metal-to-metal seals therebetween against such extremely high pressure, and annular compliant seal means sandwiched between said gaskets for providing secondary seals between such walls, said seal means including first and second compliant make-up rings adjacent said first and second gaskets, respectively, and a core ring disposed between said make-up rings and composed of a material having a lower coefficient of thermal expansion than the material of which said make-up rings are made, the relative volume of said core ring as compared to said first and second make-up rings being predetermined such that upon such temperature cycling, said core ring comprises means for preventing loss of said primary and secondary seals resulting from thermal expansion of said annular compliant seal means.

* * * * *